US008854284B2

(12) United States Patent
Houdek et al.

(10) Patent No.: US 8,854,284 B2
(45) Date of Patent: Oct. 7, 2014

(54) DISPLAY HEAT DISTRIBUTION SYSTEM

(75) Inventors: Philip J. Houdek, San Jose, CA (US);
John Ternus, Redwood City, CA (US);
Wei Chen, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 2085 days.

(21) Appl. No.: 11/843,399

(22) Filed: Aug. 22, 2007

(65) Prior Publication Data

US 2009/0051293 A1    Feb. 26, 2009

(51) Int. Cl.
*G09G 3/32* (2006.01)
*G02F 1/1335* (2006.01)

(52) U.S. Cl.
CPC .............. *G02F 1/133603* (2013.01); *G02F 2001/133628* (2013.01)
USPC .................... 345/82; 315/32; 362/249.01

(58) Field of Classification Search
CPC ........................................ G02F 2001/133628
USPC ...................... 345/102, 905, 82, 83
See application file for complete search history.

(56) References Cited

U.S. PATENT DOCUMENTS

| 2005/0243260 | A1* | 11/2005 | Kim ............................. 349/149 |
| 2006/0002142 | A1* | 1/2006 | Jeong et al. ................. 362/612 |
| 2006/0023471 | A1* | 2/2006 | Ahn et al. .................... 362/613 |
| 2006/0061539 | A1* | 3/2006 | Song et al. .................. 345/102 |
| 2007/0081344 | A1* | 4/2007 | Cappaert et al. ............. 362/373 |
| 2007/0247414 | A1* | 10/2007 | Roberts ....................... 345/102 |
| 2008/0048120 | A1* | 2/2008 | Gooch ........................ 250/338.4 |
| 2008/0088570 | A1* | 4/2008 | Chang ......................... 345/102 |
| 2008/0238336 | A1* | 10/2008 | Peng et al. ................... 315/294 |

* cited by examiner

*Primary Examiner* — Kevin M Nguyen
(74) *Attorney, Agent, or Firm* — Park, Vaughan, Fleming & Dowler LLP

(57) ABSTRACT

A display heat distribution system provides a display assembly. LEDs are mounted in the display assembly and illuminate the display assembly. Heat generation structures are mounted into the display assembly. In addition, heat distribution structures are mounted into the display assembly in a predetermined physically distributed heat management configuration. The heat generation structures and the heat distribution structures are physically located to maintain the LED temperatures at substantially uniform temperatures.

44 Claims, 8 Drawing Sheets

DISPLAY HEAT DISTRIBUTION SYSTEM

TECHNICAL FIELD

The present invention relates generally to display systems, and more particularly to a display with a distributed heat distribution system.

BACKGROUND ART

With the advance of display systems illumination technology from incandescent to fluorescent to solid-state light sources, and with ever-increasing miniaturization, one popular electronic category seems not to have kept pace. That category is large-sized personal data displays, such as personal computer monitors.

For many years, such monitors were based on cathode ray tube ("CRT") technology. More recently, flat panel displays have increasingly displaced CRT displays. The most common form of flat panel displays utilizes one or more fluorescent light sources located behind a liquid crystal display ("LCD") screen. Contemporary technology has enabled the use of cold cathode fluorescent light ("CCFL") light sources, but because a cathode emitter is still required, a high voltage source for striking and maintaining an electric arc through the CCFL is also required.

With continuing improvements in light-emitting diode ("LED") technology, such as substantial improvements in brightness, energy efficiency, color range, life expectancy, durability, robustness, and continual reductions in cost, LEDs have increasingly been of interest for superseding CCFLs in larger computer displays. Indeed, LEDs have already been widely adopted as the preferred light source in smaller display devices, such as those found on portable cellular telephones, personal data assistants ("PDAs"), personal music devices (such as Apple Inc.'s iPod®), and so forth.

One reason for preferring LED light sources to CCFL backlight light sources is the substantially larger color gamut that can be provided by LED light sources. Typically, an LCD display that is illuminated by a CCFL backlight produces about 72-74 percent of the color gamut of a CRT-based NTSC display. ("NTSC" is the analog television system in use in Canada, Japan, South Korea, the Philippines, the United States, and some other countries.) Current LED backlight display technology, however, has the potential of producing 104-118 percent or more of that gamut color space.

Another reason for not preferring CCFL bulbs is that they contain environmentally unfriendly mercury, which could be advantageously eliminated if an acceptable LED backlight light source configuration could be developed for larger displays.

When implemented in small displays such as just described, the technical requirements are readily met. As is known in the art, the illumination intensity can be rendered uniform by distributing LED light sources around the periphery of the display and utilizing light diffusing layers behind the display to equalize the display intensity. The technical challenges are modest because the screens are modest in size, so that the individual display pixels are never very far from one or more of the LED light sources. Light attenuation caused by distance from the LED light sources is therefore not great and is readily equalized by appropriate LED positioning coupled with suitable light diffusers behind the display.

One way to envision the ease with which this challenge can be met in smaller displays is to consider the number of pixels, on average, that each LED light source must support in the display, and the maximum distances per pixel that the most distant pixels are located relative to a given LED light source. These numbers are modest (perhaps in the hundreds), so the light diminution or attenuation for the most distant pixels is similarly modest and readily compensated by suitable diffuser designs.

On the other hand, the larger geometries of typical flat panel computer monitors and displays (e.g., larger than about 20 inches) create area-to-perimeter ratios that have proven untenable for current LED technologies, particularly with respect to LED brightness or light output. This has meant that it has proven unsatisfactory to attempt to replace CCFL light sources with LED light sources along one or more edges of such larger display screens. Accordingly, such displays continue to employ CCFL light sources even though CCFL light sources are increasingly less desirable than LED light sources.

It would seem that a straightforward solution for replacing CCFL light sources with LEDs would then be to arrange the LEDs in some sort of array configuration behind the LCD display screen, rather than around the perimeter. Prior attempts to do so, however, have proven unsatisfactory. Commercially viable displays for general consumption must be economical to manufacture, thin, lightweight, and must provide efficient thermal management capability. Attempts to meet these criteria in acceptable form factors and costs have been unsuccessful.

Previous efforts to achieve these objectives have failed due to a number of practical obstacles. For example, even though LED light outputs have dramatically improved in recent years, a very large number of LEDs is still required to provide sufficient brightness in such larger displays. Typically, a minimum of several hundred LEDs must be used. This then requires an enormously large maze of wires and/or bulky circuit boards to mount, support, and power such a large number of LEDs in a distributed matrix configuration. This in turn requires adequate mechanical structure to support all those components behind the LED screen. The resulting structure is bulky, thick, heavy, and not well suited for managing and removing the heat that is generated by the LEDs and the underlying electrical circuitry. It is also expensive and not well suited for efficient manufacturing.

The color and the output of each LED also depend fairly sensitively on temperature. Present technology focuses on removing heat quickly from display systems using techniques such as hat sinks, fans, and vents. Thus, the temperature shifts across the display system between hotter and cooler regions. Temperature shifts cause LED light sources to change color. A cooler LED will produce a different color light then a hotter LED. Therefore, unacceptable variations in color from one portion of the display to another adversely impact user enjoyment of LED display systems.

As a result, prior efforts to replace CCFL light sources with LEDs in commercial consumer applications have failed to move beyond the prototype stage. The complexities, including thermal management challenges, have simply combined in such a way as to leave experts in the technology convinced that they must yet await the development of new technology.

Thus, a need still remains for an improved system for a large LED backlight that is not affected by variations in temperature. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a display heat distribution system. A display assembly is provided. LEDs are mounted in the display assembly and illuminate the display assembly. Heat generation structures are mounted into the display assembly. In addition, heat distribution structures are mounted into the display assembly in a predetermined physically distributed heat management configuration. The heat generation structures and the heat distribution structures are physically located to maintain the LED temperatures at substantially uniform temperatures.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
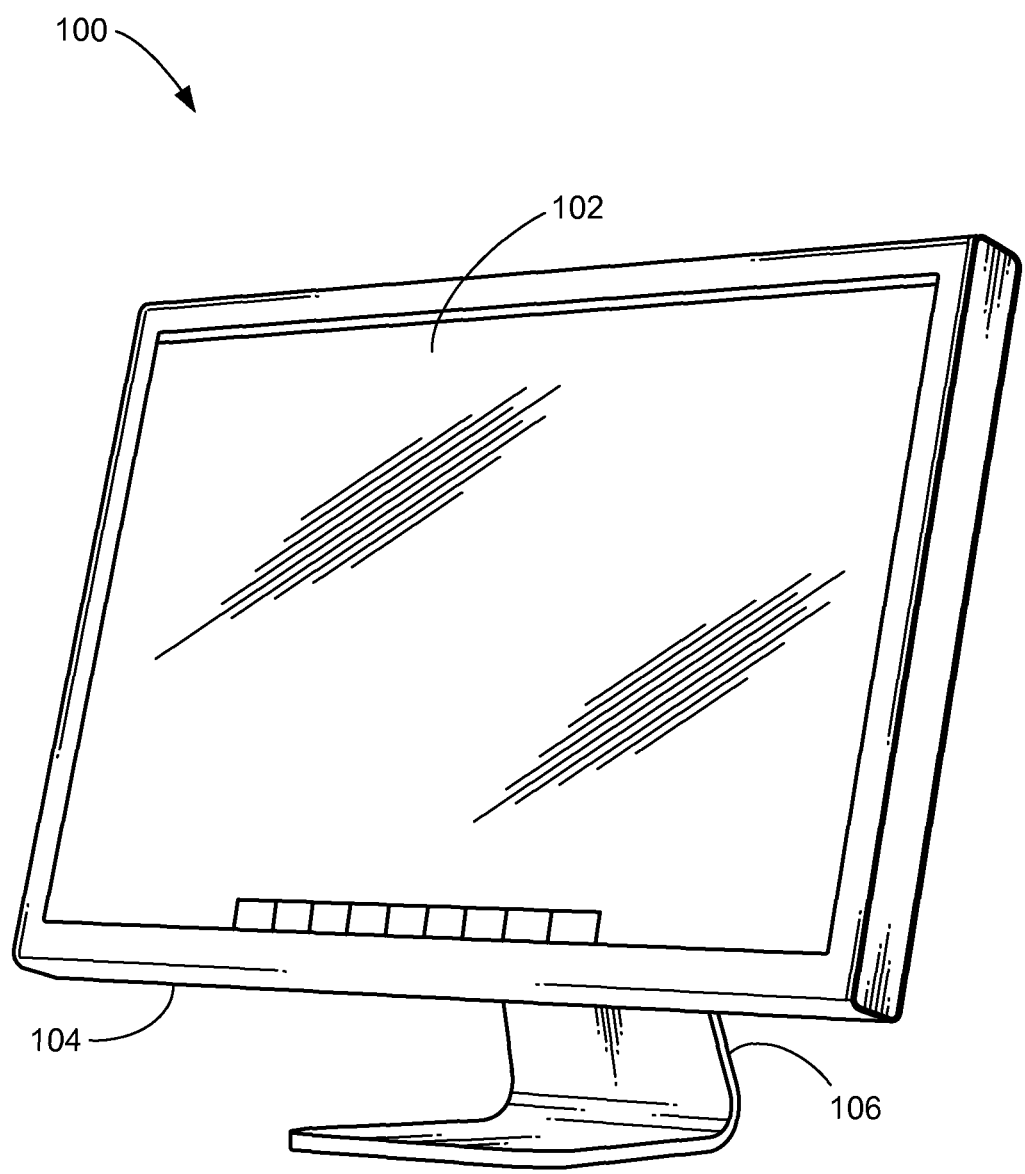
FIG. 1 is a display system having a display assembly supported in a frame, according to an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Similarly, the drawings showing embodiments of the system are semi-diagrammatic and not to scale and, particularly, some of the dimensions are for the clarity of presentation and are exaggerated in the drawing FIGs. Likewise, although the views in the drawings for ease of description generally show similar orientations, this depiction in the FIGs. is arbitrary for the most part. Generally, the invention can be considered, understood, and operated in any orientation.

In addition, where multiple embodiments are disclosed and described having some features in common, for clarity and ease of illustration, description, and comprehension thereof, similar and like features one to another will ordinarily be described with like reference numerals.

For expository purposes, terms, such as "above", "below", "bottom", "top", "side" (as in "sidewall"), "higher", "lower", "upper", "over", and "under", are defined with respect to the back of the display device except where the context indicates a different sense. The term "on" means that there is direct contact among elements.

The term "system" as used herein refers to and is defined as the method and as the apparatus of the present invention in accordance with the context in which the term is used.

With respect to the use of light-emitting diodes ("LEDs") rather than cold cathode fluorescent lights ("CCFLs"), an initial concern is thermal management. Normally, LEDs are mounted on a conventional printed circuit board ("PCB"). PCB configurations are convenient, easily configurable, and economical, but they have bad thermal properties because they do not conduct heat very well, and they exhibit mismatches in coefficient of thermal expansion ("CTE") factors, causing reliability issues and making them unsuitable for large array LED configurations. Metallic substrates can provide excellent thermal performance, equalizing temperatures and conducting heat rapidly away from the LEDs. However, due to the cost, complexity, and difficulty of solving the problem of building large such arrays and of forming circuitry thereon, conductive metallic substrates have not been employed for large LED arrays.

One possible solution for using a PCB substrate is to bond it tightly to a thermally conductive layer, such as by attaching a thermally conductive graphite layer to the PCB substrate with thermally conductive (e.g., copper ("Cu")) rivets. However, when scaled up to large displays (e.g., displays larger than conventional 20-inch computer monitors), the size and complexity of those displays (containing, for example, over 1000 LEDs) become unwieldy and uneconomical.

As explained herein, the present invention solves these problems by providing a display system that combines and utilizes a number of tile LED light sources. As used herein, the terms "tile" and "tile LED light source" are defined, according to the context in which used, to mean an assembly that is formed integrally on a thermally conductive substrate, that has more than one similar or substantially matching LED light sources that are physically mounted and electrically connected thereon and configured for emitting light therefrom, and that has fewer than the total number of LED light sources utilized by the display system into which the tile is incorporated. When used with the term "tile", the term "thermally conductive" is defined to mean having thermal conduction properties comparable to or better than those of metal.

Referring now to FIG. 1, therein is shown a display system 100 having a display assembly 102 supported in a frame 104, according to an embodiment of the present invention. In turn, the frame 104 is supported on a stand 106. The display system 100 has a distributed LED backlight (not shown, but see the backlight unit 220 in FIG. 2). As used herein, the term "backlight" is defined to mean a form of illumination that provides light for a display that illuminates the display from the back of the display. This definition means that the light is presented to the side of the display opposite the side of the display that is viewed, such that the light is shining through the display toward the viewer rather than reflecting toward the viewer from the front side of the display. As used herein, the term "distributed" is defined to mean that the LED light sources of the LED backlight are positioned across and within the area of the display assembly 102, and not just around the periphery thereof adjacent the front bezel (e.g., the front bezel 202 in FIG. 2).

Figure 2:
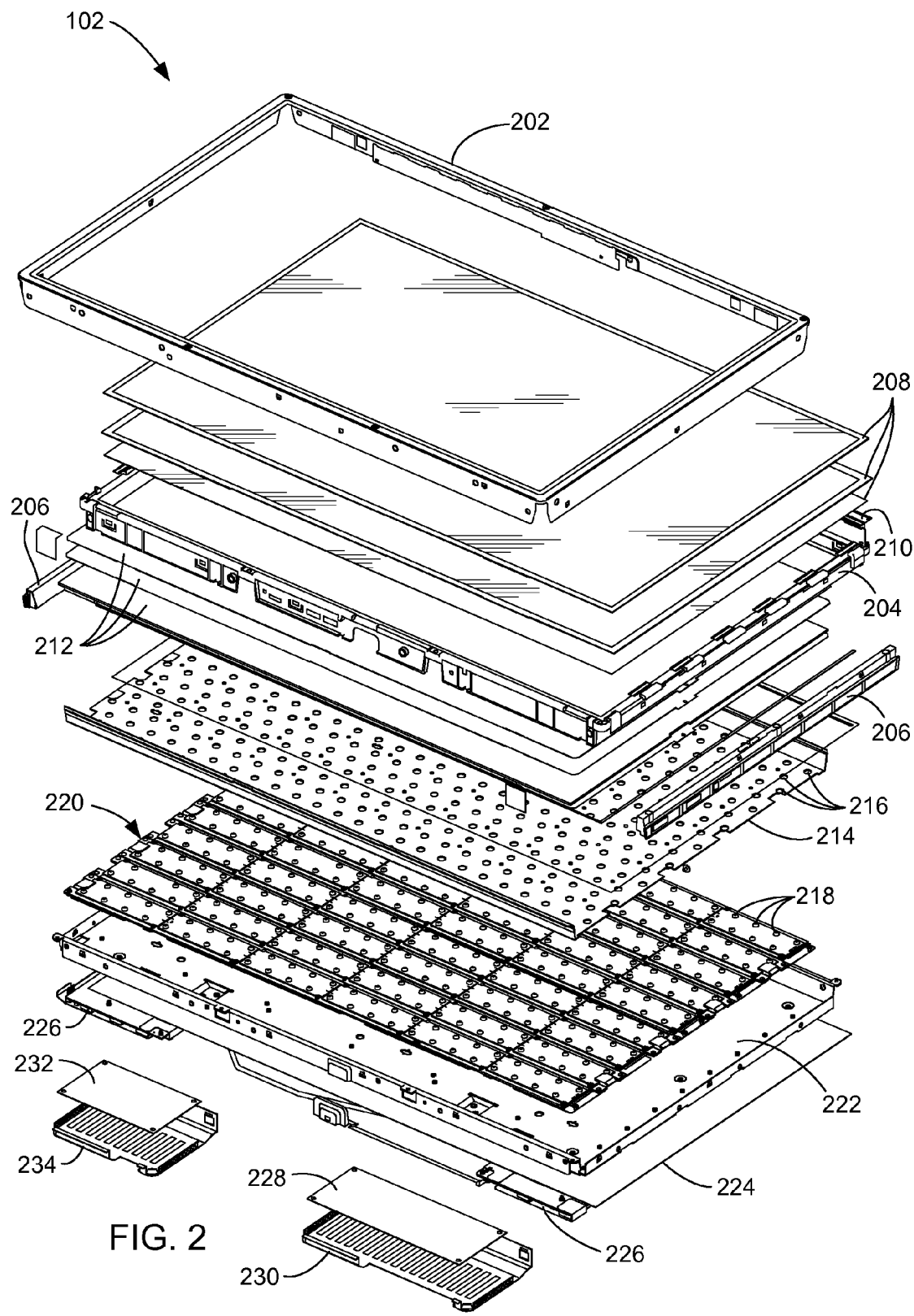
FIG. 2 is an exploded, isometric view of the majority of the major components of the display assembly shown in FIG. 1.

Referring now to FIG. 2, therein is shown an exploded, isometric view of the majority of the major components of the display assembly 102. The frame 104 (FIG. 1) includes a front bezel 202, a panel frame 204, and panel side rails 206.

The display assembly 102 also includes an LCD sub-assembly 208 that connects to LCD circuitry 210. In one embodiment, the LCD sub-assembly 208 utilizes thin film transistor ("TFT") technology to form a TFT LCD display, as is known in the art.

Beneath the LCD sub-assembly 208 are backlight diffuser sheets 212, beneath which is a reflector 214 having holes 216 therein that receive LEDs 218 on a backlight unit 220. The reflector 214 is thus positioned around the LEDs 218. The LEDs 218 are oriented forwardly toward the LCD sub-assembly 208 for illuminating the display assembly 102 from the back of the display.

The backlight unit 220 is physically and thermally attached to an array tray 222. A heat spreader 224, such as a graphite sheet, is attached to the back of the array tray 222 opposite the backlight unit 220 to conduct heat rapidly to equalize temperatures throughout the backlight unit 220. By connecting directly to the array tray 222 to which the backlight unit 220 is physically and thermally attached, the heat spreader 224 thermally integrates therewith, including with the tiles (cf. the tiles 404 in FIG. 4) in the backlight unit 220.

Beneath the heat spreader 224 are mounted split LED driver circuit boards 226 on either side of the display assembly 102. "Split" is defined to mean more than one physical circuit board is used, when commonly only one circuit board would be used for a set of features, and wherein the particular electronic functions are located as appropriate among the boards for the particular display design and the desired heat distribution. Beneath one of the split LED driver circuit boards 226, toward one side of the display assembly 102, is an LCD controller PCB 228 that is protected by an LCD controller shield 230 therebeneath. An LED power supply 232 is attached beneath the other LED driver circuit board 226 on the other side of the display assembly 102, opposite the LCD controller PCB 228. An LED power supply insulator 234 protects the LED power supply 232.

Figure 3:
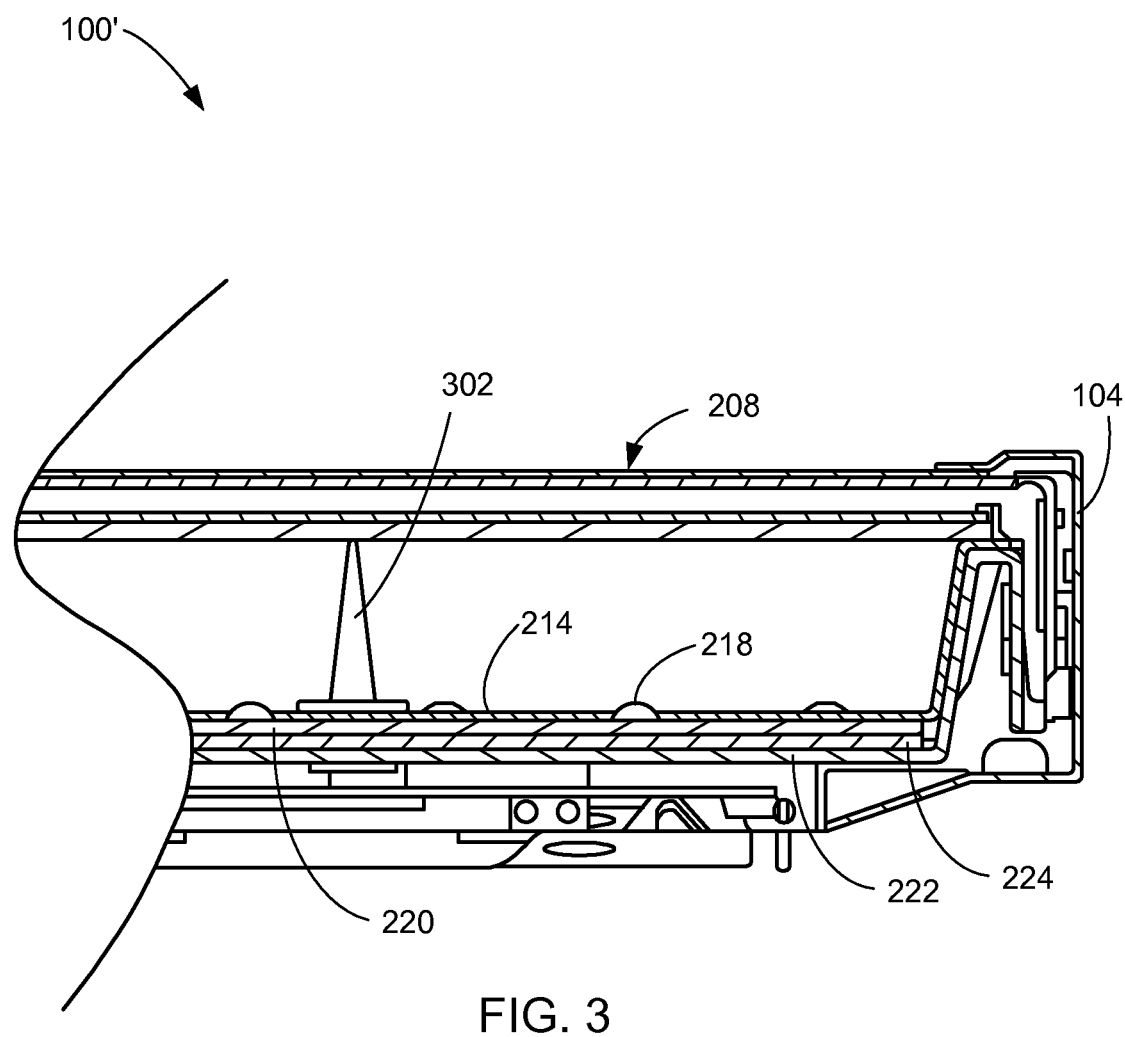
FIG. 3 is a fragmentary cross-sectional view of a display system similar to the display system shown in FIG. 1.

Referring now to FIG. 3, therein is shown a fragmentary cross-sectional view of a display system 100' similar to the display system 100 (FIG. 1). To aid in producing uniform illumination of the LCD sub-assembly 208, the backlight unit 220 is spaced therefrom by spacers 302.

System 100' also locates the heat spreader 224 between the backlight unit 220 and the array tray 222, thus positioning the heat spreader 224 closer to the backlight unit 220. This configuration is advantageous, for example, when the backlight unit 220 is a high heat producer and other electronics, such as the LED driver circuit boards 226 (FIG. 2), are low heat producers.

Figure 4:
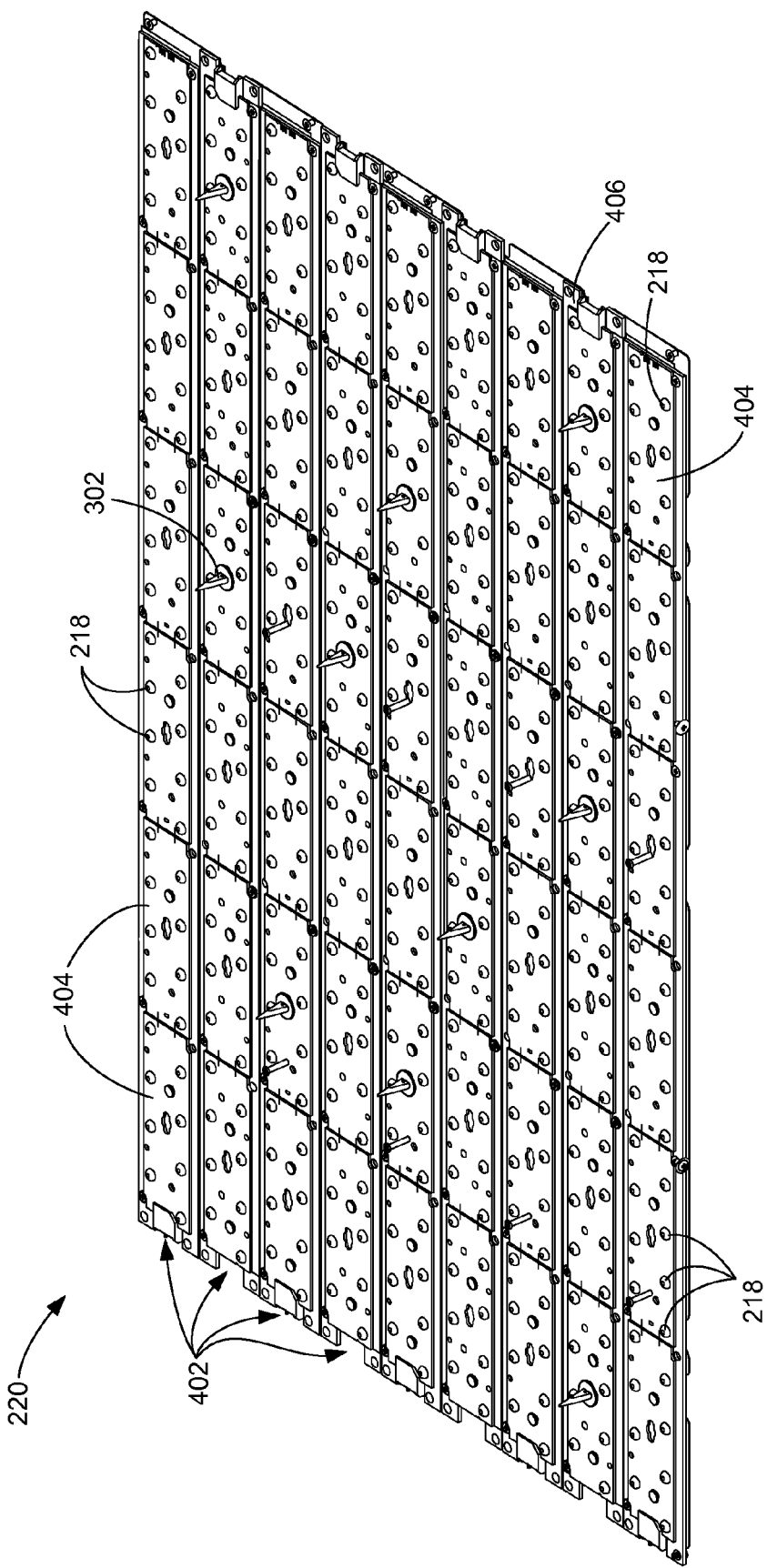
FIG. 4 is an enlarged isometric view of the backlight unit shown in FIG. 2.

Referring now to FIG. 4, therein is shown an enlarged isometric view of the backlight unit 220. The backlight unit 220 is formed of a series of parallel tile bars 402 arranged adjacent and parallel to each other. Each tile bar 402 is formed of a number of tiles 404 attached in a series on top of a tile bar rail 406.

Figure 5:
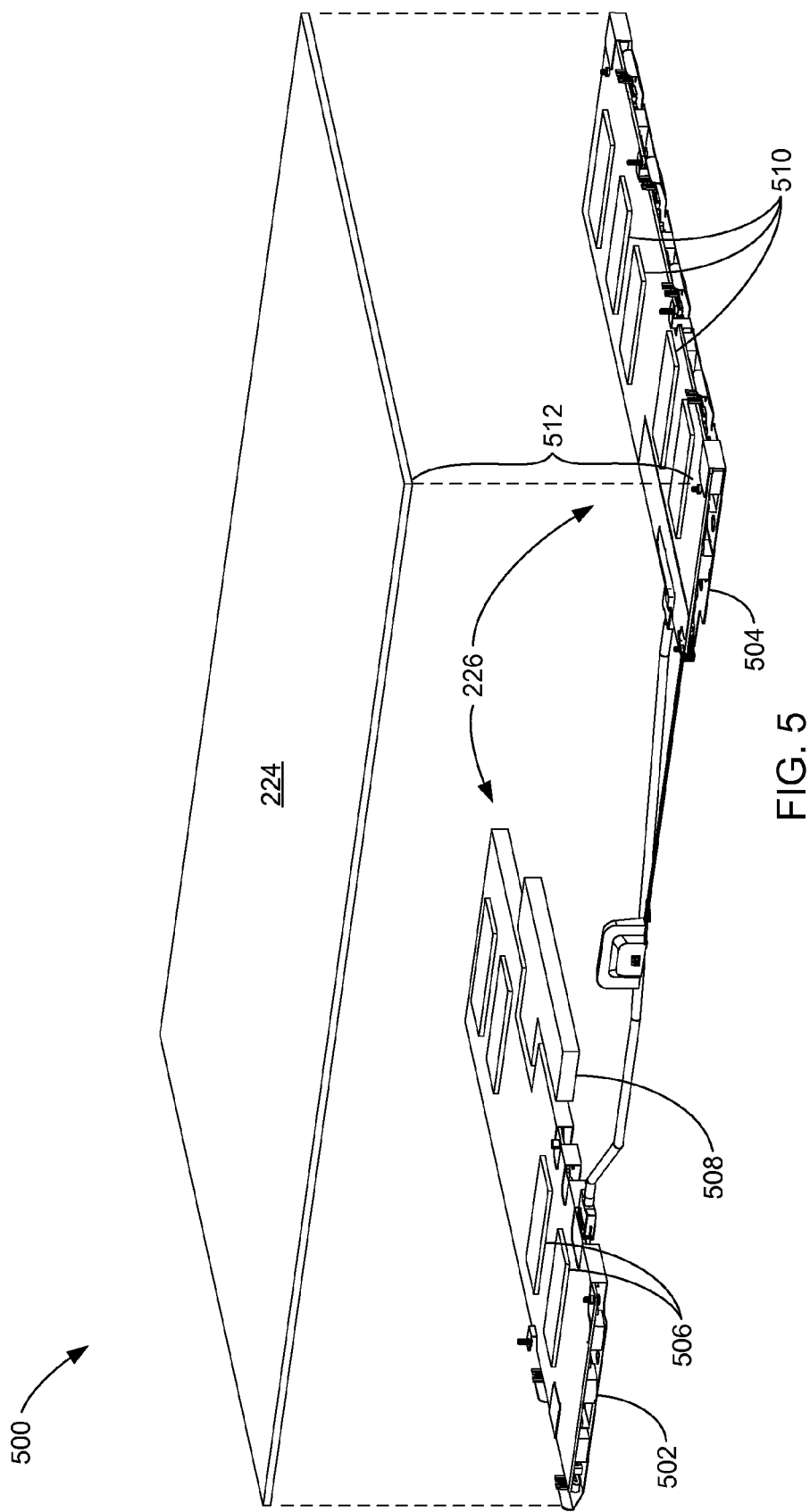
FIG. 5 is an isometric view of the LED driver circuit boards shown in FIG. 2.

Referring now to FIG. 5, therein is shown an isometric view 500 of the LED driver circuit boards 226. In this embodiment, the split LED driver circuit boards 226 are split into a first LED driver circuit board 502 and a second LED driver circuit board 504. The second LED driver circuit board 504 is positioned horizontally opposite to the first LED driver circuit board 502. Four first power driver blocks 506 and a main logic board 508 are mounted on the first LED driver circuit board 502. Five second power driver blocks 510 are mounted on the second LED driver circuit board 504. Each of the first power driver blocks 506 and the second power driver blocks 510 respectively drives a corresponding one of the tile bars 402 (FIG. 4).

Thermal management of the LEDs 218 (FIG. 2) is an important factor affecting performance. Temperature differences between the LEDs 218 cause the light color to shift between hotter and colder areas, thus discoloring images and reducing performance. Common practice is to quickly remove heat from display units using techniques such as heat sinks, fans, and vents. However, it has been unexpectedly discovered that the performance of the LEDs 218 can be improved by taking an opposite, counterintuitive approach. Instead of using heat sinks, fans, and vents to quickly remove heat, the present invention is instead enclosed and spreads heat evenly across the display system 100 (FIG. 1), allowing the heat to slowly radiate from the display system 100.

In order to spread the heat and achieve a uniform temperature of the LEDs 218 across the display system 100, the present invention thus has split LED driver circuit boards 226, as described. The first power driver blocks 506, the second power driver blocks 510, and the main logic board 508 generate heat. These and other heat generation structures (not shown) are therefore spread evenly across the first LED driver circuit board 502 and the second LED driver circuit board 504. Thus, by configuring such major heat generators, for example, to otherwise cooler portions of the display system 100, the LEDs 218 of the present invention maintain a substantially uniform temperature across large displays.

According to the present invention, "substantially uniform temperature" is defined to mean a temperature difference at and among the LEDs 218 that does not cause an objectionable color variation among the LEDs for the intended user. In one representative embodiment this amounts to a temperature difference of approximately six degrees Celsius. However, the temperature difference can be more or less depending on a number of factors in addition to the color sensitivity of the intended user. One such additional factor is the sensitivity of the LED color to temperature variations, as understood by one of ordinary skill in the art. Another factor is the ease or difficulty of compensating for color variations electronically, such as by adjusting the power factors that are provided to the LEDs, as also understood by those skilled in the art. When considering user sensitivity, it will be readily understood that a demanding end user using a high end application with strict color uniformity requirements would demand a color uniformity corresponding to a temperature variation close to zero degrees Celsius in order to achieve an acceptable color uniformity. However, a non-discriminating user without strict color uniformity requirements would be less demanding, and a temperature variation of more than six degrees Celsius would likely produce an acceptable color uniformity.

In addition to distributing the heat sources, the present invention uses heat distribution structures configured to improve heat spreading and heat uniformity. For example, in one embodiment the heat spreader 224 spreads heat across the display system 100. In addition, an air gap 512, shown greatly exaggerated, is positioned between the split LED driver circuit boards 226 and the heat spreader 224. The air gap 512, by shielding the LEDs 218 from non-uniform heat sources outside the backlight unit 220 (FIG. 4), helps to achieve a uniform heat distribution in operating conditions in which the heat spreader 224 alone may not be sufficient for that purpose. Thus, the air gap 512 and the heat spreader 224 can work together or separately to shield the LEDs 218 from non-uniform heat sources such as the split LED driver circuit boards 226. This shielding keeps hot spots on the outside of the backlight unit 220 from casting a heat shadow on the backlight unit 220, otherwise causing hotter LEDs that would produce non-uniform color.

Figure 6:
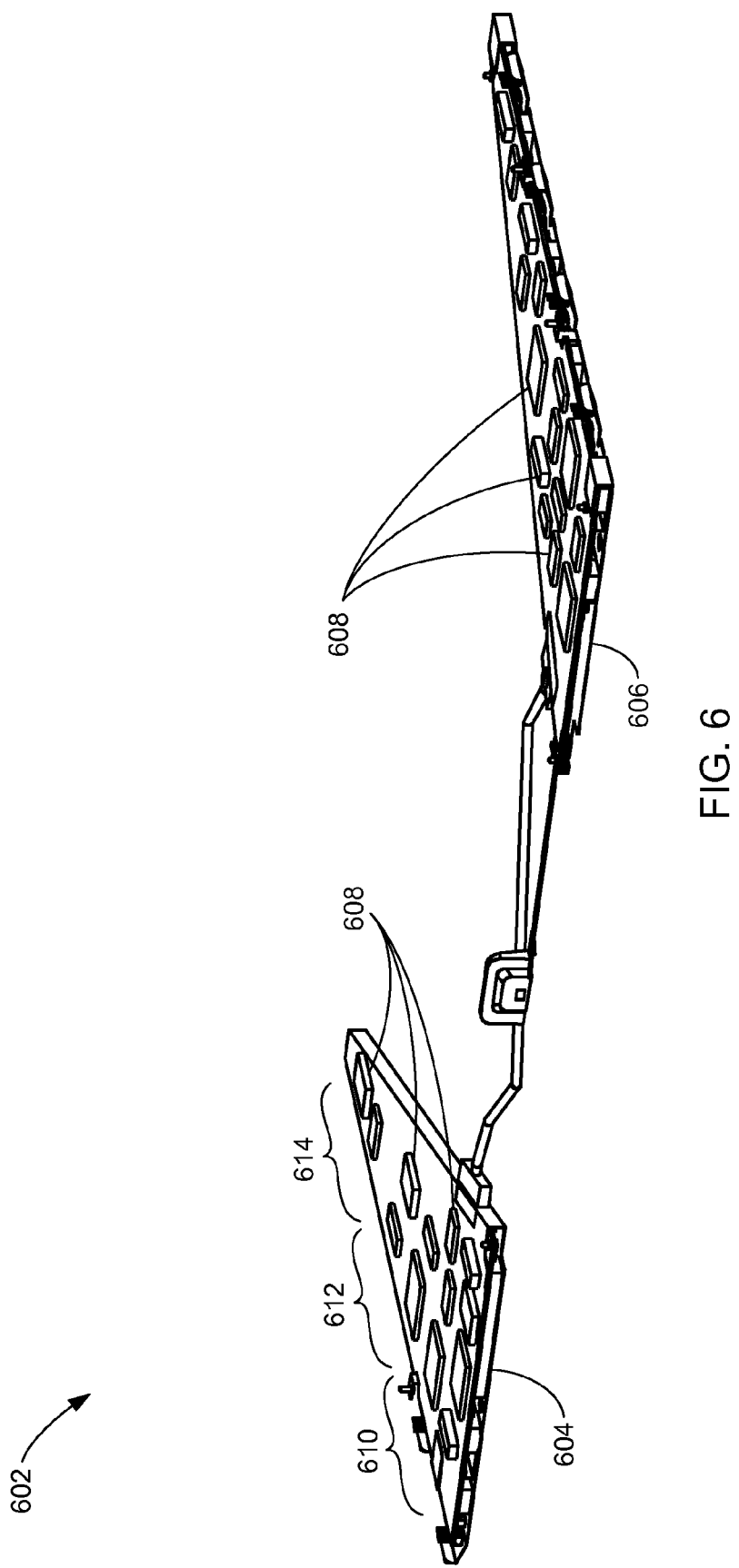
FIG. 6 is an isometric view of triangular LED driver circuit boards, according to an alternate embodiment of the present invention.

Referring now to FIG. 6, therein is shown an isometric view of LED driver circuit boards 602, according to an alternate embodiment of the present invention. In this embodiment, the LED driver circuit boards 602 are split into a first LED driver circuit board 604 and a second LED driver circuit board 606. The first LED driver circuit board 604 is positioned horizontally opposite to the second LED driver circuit board 606. The first LED driver circuit board 604 and the second LED driver circuit board 606 are shaped as triangles, wide at the bottom with the point at the top. Power driver components 608 are mounted on the first LED driver circuit board 604 and the second LED driver circuit board 606 and drive the tile bars 402 (FIG. 4). The power driver components 608 are arranged such that highest heat producers 610 (in terms of overall heat density) are mounted below medium heat producers 612, and least heat producers 614 are mounted above the medium heat producers 612. This arrangement helps to spread the heat evenly throughout the display system 100 (FIG. 1).

Figure 7:
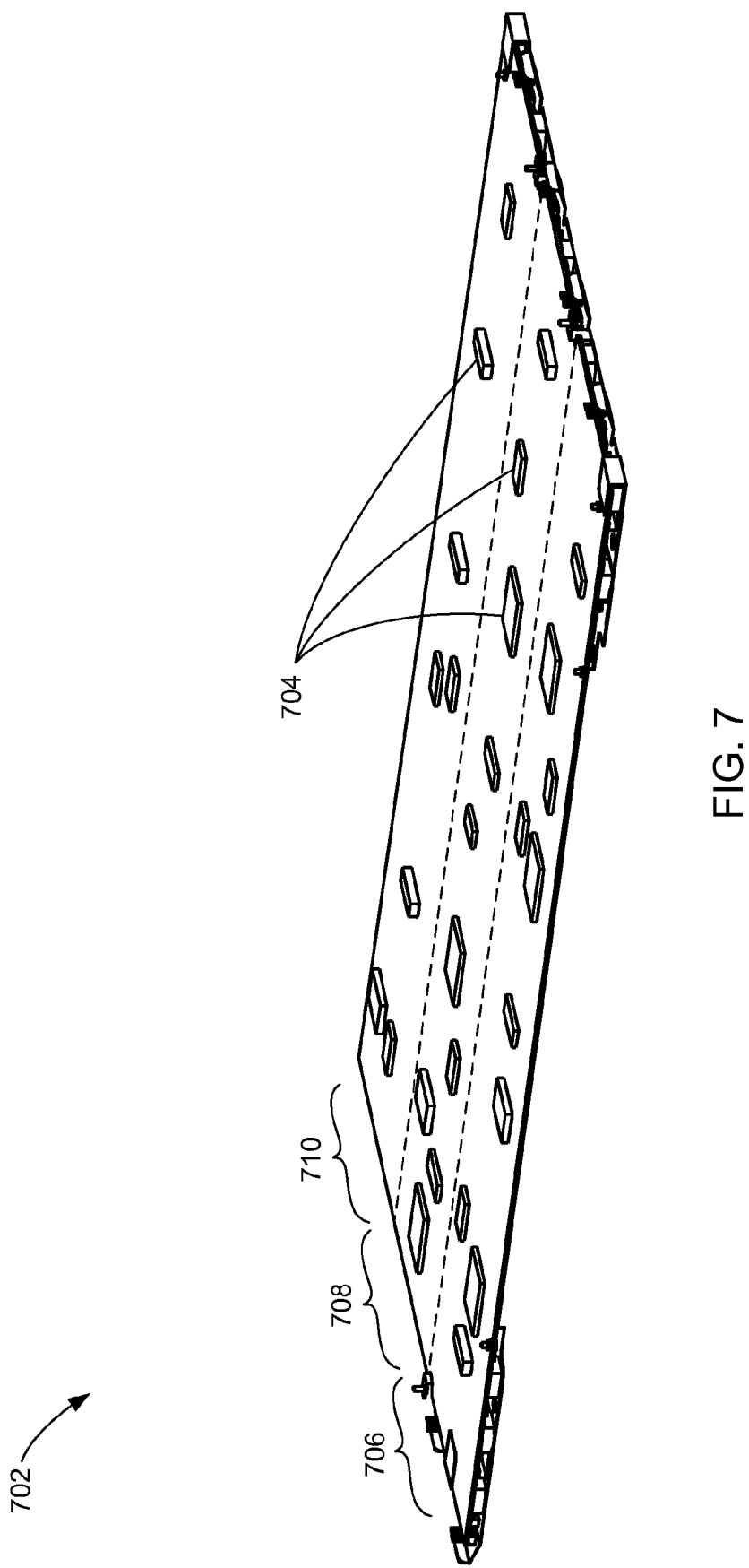
FIG. 7 is an isometric view of an oversized LED controller PCB, according to an alternate embodiment of the present invention.

Referring now to FIG. 7, therein is shown an isometric view of an oversized LED controller PCB 702, according to an alternate embodiment of the present invention. In this embodiment the oversized LED controller PCB 702 is not split and is mounted in the display system 100 (FIG. 1). The oversized LED controller 702 is defined as "oversized" because it is larger than needed to mount power driver components 704, and may be as large as the display system 100. The power driver components 704 are mounted and distributed across the oversized LED controller 702. The power driver components 704 are arranged such that highest heat producers 706 (in terms of overall heat density) are mounted below medium heat producers 708, and least heat producers 710 are mounted above the medium heat producers 708. This arrangement helps to spread the heat evenly throughout the display system 100.

Figure 8:
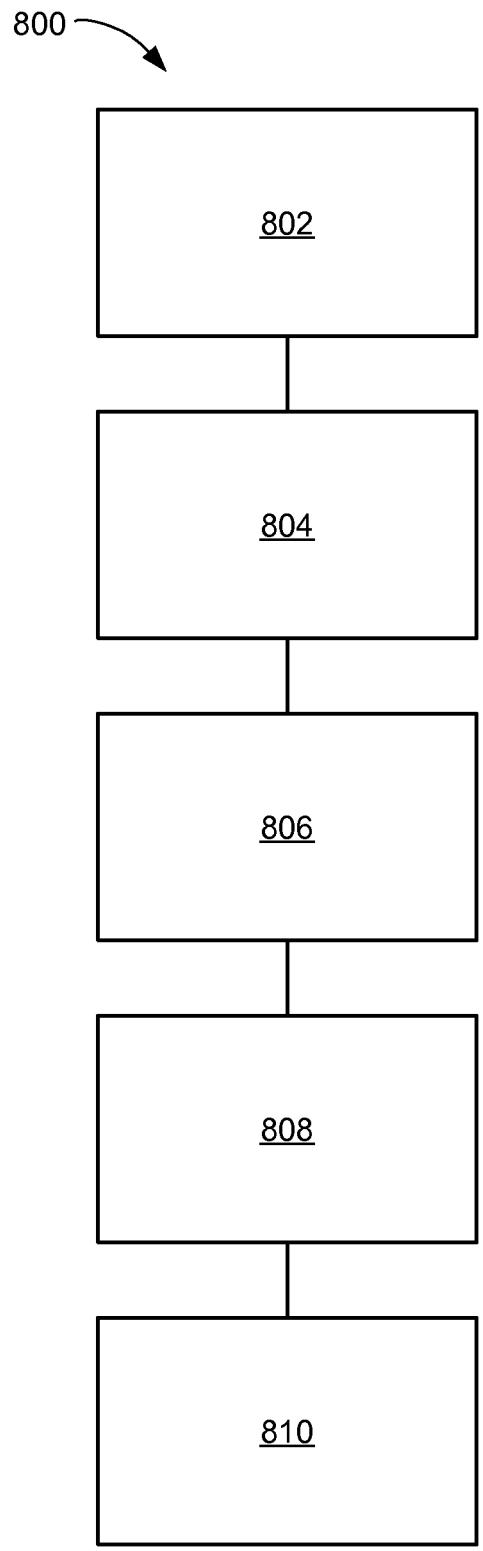
FIG. 8 is a flow chart of a display heat distribution system in an embodiment of the present invention.

Referring now to FIG. 8, therein is shown a flow chart of a display heat distribution system 800 in an embodiment of the present invention. The display heat distribution system 800 includes providing a display assembly in a block 802; mounting LEDs in the display assembly that illuminate the display assembly in a block 804; mounting heat generation structures into the display assembly in a predetermined physically distributed heat management configuration in a block 806; mounting heat distribution structures into the display assembly in a block 808; and configuring the physical locations of the heat generation structures and the heat distribution structures to maintain the LED temperatures at substantially uniform temperature in a block 810.

It has been discovered that the present invention thus has numerous aspects.

A principle aspect that has been unexpectedly discovered is that the present invention provides an improved system for a large LED display that allows for a system with a small white point color variation across the entire screen, within acceptable limits for the end user. Color variations are controlled by mounting heat generation structures and heat distribution structures into the display assembly in a set physically distributed heat management configuration, physically located to maintain the LED temperatures at substantially uniform temperatures.

Another aspect is that, while it is possible to provide some electronic thermal and color compensation, the present invention greatly fortifies the ability to achieve color uniformity through the split board improvement as taught herein.

Another aspect is that the present invention provides an excellent, consistent, and affordable consumer experience by providing LED-illuminated larger-sized displays that are easy and inexpensive to manufacture and low in cost, and quickly and accurately calibrated with uniform color performance characteristics.

An important aspect is thus that the present invention significantly facilitates the replacement of CCFL light sources with LED light sources in commercial consumer applications.

Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the display heat distribution system of the present invention furnishes important and heretofore unknown and unavailable solutions, capabilities, and functional aspects for easily, quickly, efficiently, and economically managing heat uniformity in large LED displays. The resulting processes and configurations are straightforward, cost-effective, uncomplicated, highly versatile, accurate, sensitive, and effective, and can be implemented by adapting known constituent primary components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A display heat distribution system, comprising:
   a display assembly;
   LEDs mounted in the display assembly that illuminate the display assembly; and
   heat generation structures and heat distribution structures mounted into the display assembly in a predetermined physically distributed heat management configuration physically located to maintain the LED temperatures at substantially uniform temperatures, wherein the heat generation structures comprise:
   medium heat producers;
   lower heat producers mounted above the medium heat producers; and
   higher heat producers mounted below the medium heat producers.

2. The system as claimed in claim 1 wherein the heat generation structures and the heat distribution structures further comprise split LED driver circuit boards.

3. The system as claimed in claim 2 wherein the split LED driver circuit boards comprise:
   a first LED driver circuit board;
   a second LED driver circuit board;

a first power driver block mounted on the first LED driver circuit board; and a second power driver block mounted on the second LED driver circuit board.

4. The system as claimed in claim 3 wherein the first LED driver circuit board further comprises a main logic board.

5. The system as claimed in claim 1 wherein the heat generation structures and the heat distribution structures further comprise a heat spreader.

6. The system as claimed in claim 2 wherein the heat generation structures and the heat distribution structures further comprise a heat spreader between the LEDs and the split LED driver circuit boards.

7. The system as claimed in claim 6 wherein the heat generation structures and the heat distribution structures further comprise an air gap between the split LED driver circuit boards and the heat spreader.

8. The system as claimed in claim 2 wherein the split LED driver circuit boards comprise:
a first LED driver circuit board shaped as a triangle; and
a second LED driver circuit board shaped as a triangle.

9. The system as claimed in claim 1 wherein the heat generation structures and the heat distribution structures comprise an oversized LED driver circuit board.

10. The system as claimed in claim 9 further comprising power driver components mounted on the oversized LED driver circuit board.

11. The system as claimed in claim 10 wherein the power driver components further comprise:
highest heat producers at the bottom of the oversized LED driver circuit board;
medium heat producers in the middle of the oversized LED driver circuit board; and
least heat producers near the top of the oversized LED driver circuit board.

12. A display heat distribution system, comprising:
a thermally integrated distributed LED tile matrix backlight light source;
a plurality of tile LED light sources integrated into the distributed LED tile matrix backlight light source, each tile LED light source having:
a tile; and
a plurality of LED light sources on each tile:
connected for emitting light therefrom; and
oriented for illuminating a display from the back of the display; and
heat generation structures and heat distribution structures mounted behind the distributed LED tile matrix in a predetermined physically distributed heat management configuration physically located to maintain the LED temperatures at substantially uniform temperatures, wherein the heat generation structures comprise power driver components comprising:
medium heat producing power driver components;
lower heat producing power driver components mounted above the medium heat producing power driver components; and
higher heat producing power driver components mounted below the medium heat producing power driver components.

13. The system as claimed in claim 12 wherein the heat generation structures and the heat distribution structures further comprise split LED driver circuit boards.

14. The system as claimed in claim 13 wherein the split LED driver circuit boards comprise:
a first LED driver circuit board;
a second LED driver circuit board;
a first power driver block mounted on the first LED driver circuit board; and
a second power driver block mounted on the second LED driver circuit board.

15. The system as claimed in claim 14 wherein the first LED driver circuit board further comprises a main logic board.

16. The system as claimed in claim 12 wherein the heat generation structures and the heat distribution structures further comprise a heat spreader.

17. The system as claimed in claim 13 wherein the heat generation structures and the heat distribution structures further comprise a heat spreader between the distributed LED tile matrix and the split LED driver circuit boards.

18. The system as claimed in claim 17 wherein the heat generation structures and the heat distribution structures further comprise an air gap between the split LED driver circuit boards and the heat spreader.

19. The system as claimed in claim 13 wherein the split LED driver circuit boards comprise:
a first LED driver circuit board shaped as a triangle; and
a second LED driver circuit board shaped as a triangle.

20. The system as claimed in claim 12 wherein the heat generation structures and the heat distribution structures comprise an oversized LED driver circuit board.

21. The system as claimed in claim 20 further comprising power driver components mounted on the oversized LED driver circuit board.

22. The system as claimed in claim 21 wherein the power driver components further comprise:
highest heat producers at the bottom of the oversized LED driver circuit board;
medium heat producers in the middle of the oversized LED driver circuit board; and
least heat producers near the top of the oversized LED driver circuit board.

23. A display heat distribution method comprising:
providing a display assembly;
mounting LEDs in the display assembly that illuminate the display assembly;
mounting heat generation structures into the display assembly in a predetermined physically distributed heat management configuration, wherein mounting the heat generation structures comprises:
mounting medium heat producers;
mounting lower heat producers above the medium heat producers; and
mounting higher heat producers below the medium heat producers;
mounting heat distribution structures into the display assembly in a predetermined physically distributed heat management configuration; and
configuring the physical locations of the heat generation structures and the heat distribution structures to maintain the LED temperatures at substantially uniform temperatures.

24. The method as claimed in claim 23 further comprising mounting split LED driver circuit boards.

25. The method as claimed in claim 24 wherein mounting the split LED driver circuit boards comprises:
providing a first LED driver circuit board;
positioning a second LED driver circuit board horizontally opposite to the first LED driver circuit board;
mounting a first power driver block on the first LED driver circuit board; and
mounting a second power driver block on the second LED driver circuit board.

26. The method as claimed in claim 25 wherein providing the first LED driver circuit board further comprises mounting a main logic board on the first LED driver circuit board.

27. The method as claimed in claim 23 wherein mounting the heat distribution structures further comprises mounting a heat spreader.

28. The method as claimed in claim 24 wherein mounting the heat distribution structures further comprises mounting a heat spreader between the LEDs and the split LED driver circuit boards.

29. The method as claimed in claim 28 wherein mounting the heat distribution structures further comprises positioning an air gap between the split LED driver circuit boards and the heat spreader.

30. The method as claimed in claim 24 wherein mounting the split LED driver circuit boards comprises:
   providing a first LED driver circuit board shaped as a triangle; and
   positioning a second LED driver circuit board shaped as a triangle horizontally opposite to the first LED driver circuit board.

31. The method as claimed in claim 23 further comprising mounting an oversized LED driver circuit board.

32. The method as claimed in claim 31 further comprising mounting power driver components on the oversized LED driver circuit board.

33. The method as claimed in claim 32 wherein mounting the power driver components further comprises:
   mounting highest heat producers at the bottom of the oversized LED driver circuit board;
   mounting medium heat producers in the middle of the oversized LED driver circuit board; and
   mounting least heat producers near the top of the oversized LED driver circuit board.

34. A display heat distribution method, comprising:
   providing a thermally integrated distributed LED tile matrix backlight light source;
   integrating a plurality of tile LED light sources into the distributed LED tile matrix backlight light source, each tile LED light source having:
      a tile; and
      a plurality of LED light sources on each tile:
         connected for emitting light therefrom; and
         oriented for illuminating a display from the back of the display;
   mounting heat generation structures behind the distributed LED tile matrix in a predetermined physically distributed heat management configuration, wherein mounting the heat generation structures comprises mounting power driver components comprising:
      mounting medium heat producing power driver components;
      mounting lower heat producing power driver components above the medium heat producing power driver components; and
      mounting higher heat producing power driver components below the medium heat producing power driver components;
   mounting heat distribution structures behind the distributed LED tile matrix in a predetermined physically distributed heat management configuration; and
   configuring the physical locations of the heat generation structures and heat distribution structures to maintain the LED temperatures at substantially uniform temperatures.

35. The method as claimed in claim 34 further comprising mounting split LED driver circuit boards.

36. The method as claimed in claim 35 wherein mounting the split LED driver circuit boards comprises:
   providing a first LED driver circuit board;
   positioning a second LED driver circuit board horizontally opposite to the first LED driver circuit board;
   mounting a first power driver block on the first LED driver circuit board; and
   mounting a second power driver block on the second LED driver circuit board.

37. The method as claimed in claim 36 wherein providing the first LED driver circuit board further comprises mounting a main logic board on the first LED driver circuit board.

38. The method as claimed in claim 34 wherein mounting the heat distribution structures further comprises mounting a heat spreader.

39. The method as claimed in claim 35 wherein mounting the heat distribution structures further comprises mounting a heat spreader between the distributed LED tile matrix and the split LED driver circuit boards.

40. The method as claimed in claim 39 wherein mounting the heat distribution structures further comprises positioning an air gap between the split LED driver circuit boards and the heat spreader.

41. The method as claimed in claim 35 wherein mounting the split LED driver circuit boards comprises:
   providing a first LED driver circuit board shaped as a triangle; and
   positioning a second LED driver circuit board shaped as a triangle horizontally opposite to the first LED driver circuit board.

42. The method as claimed in claim 34 further comprising an oversized LED driver circuit board.

43. The method as claimed in claim 42 further comprising mounting power driver components on the oversized LED driver circuit board.

44. The method as claimed in claim 43 wherein mounting the power driver components further comprise:
   mounting highest heat producers at the bottom of the oversized LED driver circuit board;
   mounting medium heat producers in the middle of the oversized LED driver circuit board; and
   mounting least heat producers near the top of the oversized LED driver circuit board.

* * * * *